(No Model.)
F. P. KELLER.
COMBINED TRUCK AND CARRIER.
No. 407,218. Patented July 16, 1889.
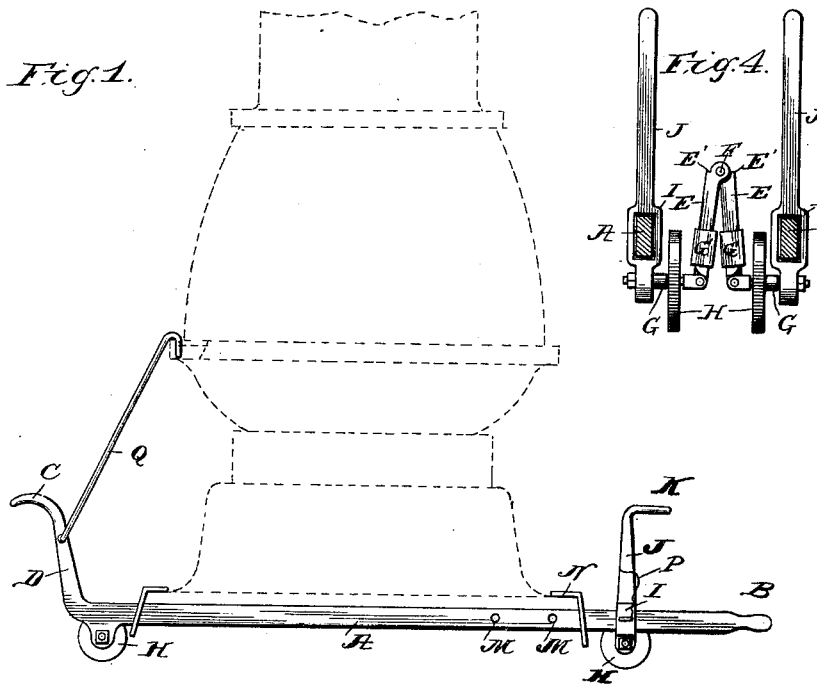
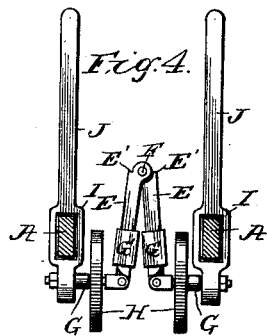
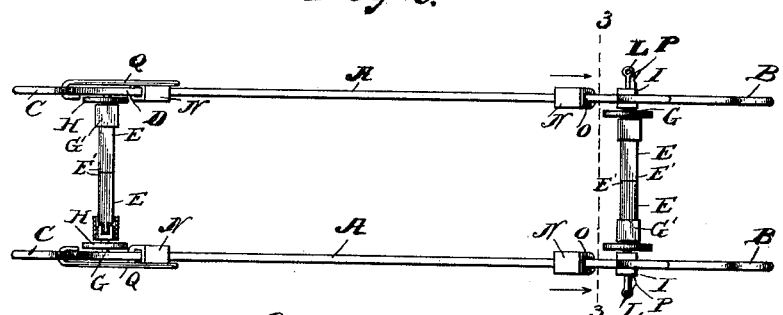
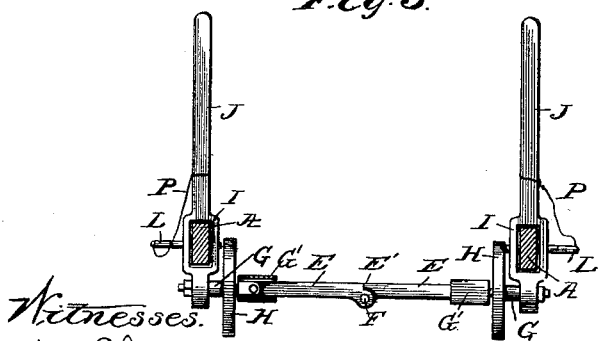
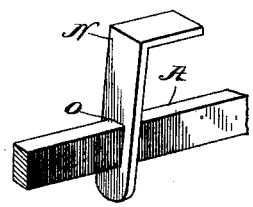
Witnesses:
Inventor:
Franklin P. Keller
By Jno. G. Elliott
Att'y

UNITED STATES PATENT OFFICE.

FRANKLIN P. KELLER, OF SAVANNAH, ASSIGNOR OF ONE-HALF TO STAATS F. CHAMPLIN, OF CHICAGO, ILLINOIS.

COMBINED TRUCK AND CARRIER.

SPECIFICATION forming part of Letters Patent No. 407,218, dated July 16, 1889.

Application filed July 17, 1888. Serial No. 280,181. (No model.)

*To all whom it may concern:*

Be it known that I, FRANKLIN P. KELLER, a citizen of the United States, residing at Savannah, in the county of Carroll and State of Illinois, have invented certain new and useful Improvements in a Combined Truck and Carrier, of which the following is a specification.

This invention relates to improvements in a combined truck and carrier for transporting by hand heavy articles—such as stoves, pianos, and the like—and is especially designed as an improvement upon the invention set forth in United States Letters Patent No. 370,949, granted me October 4, 1887. In this patent is shown a pair of parallel bars terminating at each end in handles connected together by means of transverse chains of ordinary construction, or some similar flexible connection, from which bars is suspended a flexible chain supporting-frame, to which is attached grappling-hooks especially designed for use in lifting barrels and similar heavy articles, the bars being free at all times to have a longitudinal or parallel movement independently of each other.

The prime object of this invention is to have a carrier in which the carrying-bars are flexibly connected together in such manner that they may be moved laterally toward and away from each other, but are held rigid at all times against a longitudinal movement relative to each other.

Another object is to combine with such a carrier truck-wheels so attached thereto that the carrier may be employed as a truck, and when not in use may be folded up and stored in a comparatively small compass out of the way.

A further object is to have the flexible connection between the bars of such a combined truck and carrier so constructed that when extended and employed either as a truck or carrier the said connection may be made rigid both as to a vertical and longitudinal strain, whereby the bars and wheels will be held upright and in perfect alignment.

A further object is to have the handles of such a combined truck and carrier so arranged that they may be employed either for lifting it bodily or propelling it as a truck, and when used in the latter capacity avoid the necessity of the operator stooping.

A still further object is to provide grappling-hooks upon said bars for maintaining the article being carried in proper position, and held in position solely by friction, and to have such hooks, as well as the wheels, adjustable upon the bars, whereby the weight being carried may be centered thereon and evenly distributed.

I attain these objects by the devices illustrated in the accompanying drawings, in which—

Figure 1 represents a side elevation of a combined truck and carrier embodying my invention; Fig. 2, a plan view thereof; Fig. 3, a transverse section on the line 3 3 of Fig. 2, showing the truck extended; Fig. 4, a similar view showing the truck folded up; and Fig. 5, a perspective view of a portion of one of the bars, showing the grappling-hooks mounted thereon.

Similar letters of reference indicate the same parts in the several figures of the drawings.

Referring by letter to the accompanying drawings, A A indicate parallel bars terminating at one end in handles B in a line with said bars and at the opposite ends in handles C, offset from and elevated above the bars by means of the angular portions D of said bars, both for convenience in carrying articles up or down a stairway and in the use of the carrier as a truck, as will be hereinafter explained. These bars are connected together toward each end thereof by means of links connected together by horizontal pivots F, midway between the bars, in such manner that they, and consequently the bars, may have a vertical movement relative to each other, but are held against a horizontal movement, so that while said bars are at all times free to be moved laterally toward and away from each other (being limited in such movements only by the length of the links) they are held at all times against a parallel movement relative to each other. The central joint between these links is what is commonly known as a "rule-joint," the shoulders E' of which are above the pivot and abut against each other when the links are extended to a horizontal position, so that they cannot swing down below that position, but become a rigid connection between the bars, which can only be broken by an upward strain upon the links, which permits the bars to approach each other. These links at their outer ends are pivotally connected with short journals G, upon which are loosely mounted wheels H between said pivots and the bars, which adapt the carrier for use as a truck, the pivotal joint between the link and journals being made rigid when the machine is extended and the links are in a horizontal position by means of sleeves G', mounted and sliding upon the links, and which may be moved from over the joint whenever it is desired to fold up the machine, such joint permitting the machine to fold more compactly than would otherwise be possible, while the truck as a whole remains upright.

The journals of the forward pair of wheels bear fixedly in the bars, while the journals of the rear pair bear in sliding boxes I, mounted and adjustable on said bars and provided with upwardly-projecting arms J, terminating in handles K, by means of which the operator at this end may propel the truck when resting all of its wheels without the necessity of his stooping when so doing, or when used as a carrier either set of handles may be employed, the handles K being frequently preferable, because the machine need not thereby be lifted so high as by the lower set B. Then, again, the truck may be employed in the usual manner, in which case the truck would tilt and rest only upon the forward wheels, in which position the angular extensions D would be employed, as the front end of two-wheeled trucks are now employed, for inserting under the article to be carried.

The adjustable boxes I may be secured at any desired point upon the bars by means of pins L, passing through perforations in said boxes and corresponding registering perforations M in said bars, thereby enabling the weight of the article being carried to be centered between the front and rear wheels and handles, so that it will be evenly divided between the operators.

Upon the bars and between the front and rear wheels are also mounted grappling-hooks N, sliding and adjustable thereon by reason of the slot O therein, by which it is secured upon the bar, being of a size and contour to fit snugly upon the bars, these grappling-hooks depending solely upon their frictional hold upon said bars for maintaining them in any adjustable position—that is to say, when clutched upon the article being carried the walls of the slot therein will tightly grip or bind upon the top and bottom of the bars, and thereby effectually prevent their accidental shifting.

The pins L are preferably secured to the arms J of the adjustable boxes by means of cords P, or in any other convenient manner that will prevent their loss when withdrawn from the perforations in the boxes and bars.

A carrier such as is herein shown and described is especially adapted for transporting stoves, whether of square, cylindrical, or any other shape, in which use, as shown by dotted lines in Fig. 1, the base of the stove rests upon the bars and is held in position by the grappling-hooks, being prevented from toppling over by means of hook-rods Q, pivotally attached to the angular portions of the bars, the hook ends of which are designed to engage a flange or other suitable projection upon the body of the stove, and, if desired, a second set of these rods may be attached to the bars at the opposite end thereof; but these latter rods will be found not generally necessary.

Having described my invention, what I claim, and desire to secure by Letters Patent, is—

1. The parallel carrying bars, in combination with links connecting said bars, a vertical rule-joint between said links, pivot-connections between said links and bars, and adjustable sliding sleeves fitting over said pivot-connections for rendering them rigid, substantially as described.

2. The parallel carrying-bars, in combination with links connecting said bars, a horizontal pivot-connection between said links, opposing abutting shoulders on the links above said pivot-connection, pivot-connections between said links and bars, and adjustable sleeves sliding on said bars and fitting over said pivot-connections, substantially as described.

3. The parallel carrying-bars, links connecting said bars, and a horizontal pivot-connection between said links, in combination with truck-wheels and a journal for said wheels on said links, substantially as described.

4. The parallel carrying-bars, links connecting said bars, and a horizontal pivot-connection between said links, in combination with journals bearing in said bars at one end and having a pivotal connection with the links at their opposite ends, truck-wheels loosely mounted on said journals, and adjustable sleeves sliding upon the links and fitting over said pivot-connections, substantially as described.

5. The parallel carrying-bars, a vertically-flexible but horizontally-rigid connection between said bars at one end, and wheels journaled on said connection, in combination with adjustable sliding boxes mounted on said bars toward their opposite ends, a vertically-flexible but horizontally-rigid connection between said boxes, and wheels journaled on said connection, substantially as described.

6. The parallel carrying-bars, a vertically-flexible but horizontally-rigid connection between said bars at one end thereof, and wheels journaled on said connection, in combination with adjustable sliding boxes mounted on said bars toward the opposite ends thereof, arms projecting from said boxes terminating in handles, a vertically-flexible but horizontally-rigid connection between said boxes, and wheels journaled on said connection, substantially as described.

7. The parallel carrying-bars, a vertically-flexible but horizontally-rigid connection between said bars at one end, wheels journaled thereon, adjustable sliding boxes mounted on said bars toward the opposite ends thereof, a vertically-flexible but horizontally-rigid connection between said boxes, and wheels journaled on said connection, in combination with adjustable grappling-hooks mounted on said bars between said front and rear wheels and a sliding connection between said hooks and bars, substantially as described.

8. The parallel carrying-bars, a vertically-flexible but horizontally-rigid connection between said bars at one end thereof, wheels journaled on said connection, adjustable sliding boxes mounted on said bars toward the opposite ends thereof, a vertically-flexible but horizontally-rigid connection between said boxes, and wheels journaled on said connections, in combination with adjustable grappling-hooks mounted on said bars and provided with slots corresponding in size and contour to and through which the bars project, substantially as described.

FRANKLIN P. KELLER.

Witnesses:
JNO. G. ELLIOTT,
ALBERT M. BENNETT.